(12) United States Patent
Reiter

(10) Patent No.: US 9,075,145 B2
(45) Date of Patent: Jul. 7, 2015

(54) COMBINING DATA FROM MULTIPLE RADAR SIGNALS ON A SINGLE PLAN POSITION INDICATOR (PPI) DISPLAY

(75) Inventor: Carsten Reiter, Preetz (DE)

(73) Assignee: RAYTHEON ANSCHUTZ GMBH, Kiel (DE)

( * ) Notice: Subject to any disclaimer, the term of this patent is extended or adjusted under 35 U.S.C. 154(b) by 619 days.

(21) Appl. No.: 13/320,017

(22) PCT Filed: May 12, 2009

(86) PCT No.: PCT/EP2009/055725
§ 371 (c)(1),
(2), (4) Date: Feb. 3, 2012

(87) PCT Pub. No.: WO2010/130286
PCT Pub. Date: Nov. 18, 2010

(65) Prior Publication Data
US 2012/0133546 A1      May 31, 2012

(51) Int. Cl.
*G01S 13/87*        (2006.01)
*G01S 13/93*        (2006.01)
(Continued)

(52) U.S. Cl.
CPC ............ *G01S 13/9307* (2013.01); *G01S 7/003* (2013.01); *G01S 7/12* (2013.01); *G01S 7/295* (2013.01); *G01S 13/87* (2013.01)

(58) Field of Classification Search
CPC ..... G01S 13/87; G01S 13/9307; G01S 7/003; G01S 7/12; G01S 7/295
USPC ......................................................... 342/59
See application file for complete search history.

(56) References Cited

U.S. PATENT DOCUMENTS 3,223,996 A    12/1965  Voles
5,311,187 A    5/1994   Garside
(Continued)

FOREIGN PATENT DOCUMENTS

EP    1 742 083    1/2007
GB    2 093 306    8/1982
(Continued)

OTHER PUBLICATIONS

PCT International Preliminary Report on Patentability for Appl. No. PCT/EP2009/055725 dated Nov. 24, 2012.
(Continued)

*Primary Examiner* — Timothy A Brainard
(74) *Attorney, Agent, or Firm* — Daly, Crowley, Mofford & Durkee, LLP

(57) ABSTRACT

In certain embodiments, a method for combining data from multiple radar signals on a single PPI includes receiving, from a first radar device having a first angular range of visibility, first radar signal data corresponding to the first angular range of visibility. The method further includes receiving, from a second radar device having a second angular range of visibility, second radar signal data corresponding to the second angular range of visibility. The method further includes performing compensation processing on at least a portion of the second radar signal data to form modified second radar signal data that is correlated to the first radar signal data. The method further includes combining at least a portion the first radar signal data with at least a portion of the modified second radar signal data to form combined radar signal data and generating, based on the combined radar signal data, a display on a radar PPI display.

18 Claims, 5 Drawing Sheets

(51) Int. Cl.
*G01S 7/12* (2006.01)
*G01S 7/295* (2006.01)
*G01S 7/00* (2006.01)

(56) References Cited

U.S. PATENT DOCUMENTS

| | | | |
|---|---|---|---|
| 6,249,241 B1 * | 6/2001 | Jordan et al. | 342/41 |
| 2006/0017939 A1 * | 1/2006 | Jamieson et al. | 356/622 |
| 2008/0169974 A1 * | 7/2008 | Fujikawa et al. | 342/179 |

FOREIGN PATENT DOCUMENTS

| | | |
|---|---|---|
| GB | 2093306 A * | 8/1982 |
| WO | WO 2007/022376 | 2/2007 |

OTHER PUBLICATIONS

PCT Notice of Transmittal of the International Search Report and the Written Opinion of the International Search Authority, or the Declaration, PCT/EP2009/055725 16 pp. dated Feb. 4, 2010.

* cited by examiner

COMBINING DATA FROM MULTIPLE RADAR SIGNALS ON A SINGLE PLAN POSITION INDICATOR (PPI) DISPLAY

TECHNICAL FIELD

This invention relates generally to radar systems and more particularly to combining data from multiple radar signals on a single PPI display.

BACKGROUND

Shipboard navigation radars assist navigators of ships in avoiding collisions by allowing the navigators to locate land and objects (e.g., ships, buoys) beyond what can be seen from the ship itself. In early shipboard navigation radars, analog circuits were used to generate a two-dimensional image (e.g., a PPI) on a cathode ray tube (CRT) display. These analog circuits formed the image by driving the rotation of the cathode ray around the CRT in synch with the rotation of the radar antenna, by re-centering the cathode ray with each trigger of the radar transmitter (or transceiver), and by timing the sweep of the cathode ray with the radar echoes processed by the radar receiver (or transceiver). This sort of image was swept out in real time, using the persistence of phosphors in the CRT to hold the image on the display long enough to be useful in navigation.

With the advent of inexpensive television CRT displays and flat panel displays of large size, radar engineers migrated the plan position indicator (PPI) image generation away from analog circuits into digital electronic circuits and firmware. Because these CRT displays and flat panel displays are designed for television, however, they generate images using a raster scan. In other words, CRT displays and flat panel displays generate images using data formatted in Cartesian coordinates rather than data formatted in polar coordinates (azimuth angle and range) natural for radars. The adaptation of radar to raster-scanned monitors may be achieved by converting the polar formatted data (generated by radar antennas) into Cartesian coordinates (which can be displayed on raster scan CRT displays and flat panel displays).

SUMMARY

According to the present invention, disadvantages and problems associated with previous techniques for combining data from multiple radar signals on a single PPI display may be reduced or eliminated.

In certain embodiments, a method for combining data from multiple radar signals on a single PPI includes receiving, from a first radar device having a first angular range of visibility, first radar signal data corresponding to the first angular range of visibility. The method further includes receiving, from a second radar device having a second angular range of visibility, second radar signal data corresponding to the second angular range of visibility. The method further includes performing compensation processing on at least a portion of the second radar signal data to form modified second radar signal data that is correlated to the first radar signal data. The method further includes combining at least a portion the first radar signal data with at least a portion of the modified second radar signal data to form combined radar signal data and generating, based on the combined radar signal data, a display on a radar PPI display.

Certain embodiments of the present invention may provide one or more technical advantages. Ships are often required to carry at least two radar devices to leave port. As a result of this requirement, such ships often carry two separate radar devices. Each radar device may suffer from one or more blind zones resulting from ship structures (e.g., a ship mast). Conventional techniques for eliminating blind zones (i.e., providing a full three-hundred sixty degree, or at least an improved, angular range of visibility to a radar operator/navigator) may include providing two separate PPI displays, one PPI display generated based on the radar signal from each of the two separate radar devices. Having two separate PPI displays may be undesirable, however, as it is not an optimal use of display space on a ships crowded bridge.

Combining the data from radar signals from multiple radar devices into a single buffer table to generate combined radar signal data may allow for the generation of a PPI display based on the combined radar signal data. Generating a PPI display based on the combined radar signal data may reduce or eliminate blind zones associated with each radar device (e.g., a full three-hundred sixty degree view may be provided despite the blind zones associated with the individual radar devices) while eliminating the need for multiple PPI displays (one for each radar device, as used with certain conventional techniques). As a result, the amount of space for radar PPI displays on a ship's crowded bridge may be reduced.

Conventional techniques may further include displaying target tracks associated with data from each radar signal on a single PPI display such that a radar operator/navigator may view the full track picture on the single PPI display. However, because the target tracks are associated with data from separate radar signals, track handoff must be performed as a target moves from being tracked by one radar device to being tracked by the other radar device. Track handoff, however, is often inaccurate, particularly as a large target moves from being tracked by one radar device to being tracked by the other radar device at relatively close range.

Combining data from multiple radar signals generated by multiple radar devices into a single buffer table to generate combined radar signal data and performing tracking based on the combined radar signal data may allow a radar operator/navigator to view the full track picture on a single PPI display while eliminating problems associated with track handoff.

Additionally, a ship may carry two dissimilar radar devices. For example, a ship may carry an X-band radar device (high resolution) and an S-band radar device. (high rain penetration). X-band radar devices typically provide high resolution, but X are typically heavily affected by sea or rain clutter. S-Band radar devices typically provide lower resolution than X-band radar devices, but provide superior rain penetration. Combining radar signal data from the X-band radar device with radar signal data from the S-band radar device in a single buffer table to generate combined radar signal data may allow for the generation of a PPI display in which the X-band radar device is utilized to generate the portion of the PPI display for short ranges (for which high resolution is more important and rain penetration is less important) and the S-band radar device is utilized to generate the portion of the PPI display for long ranges (for which high resolution is less important and superior rain penetration more important).

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
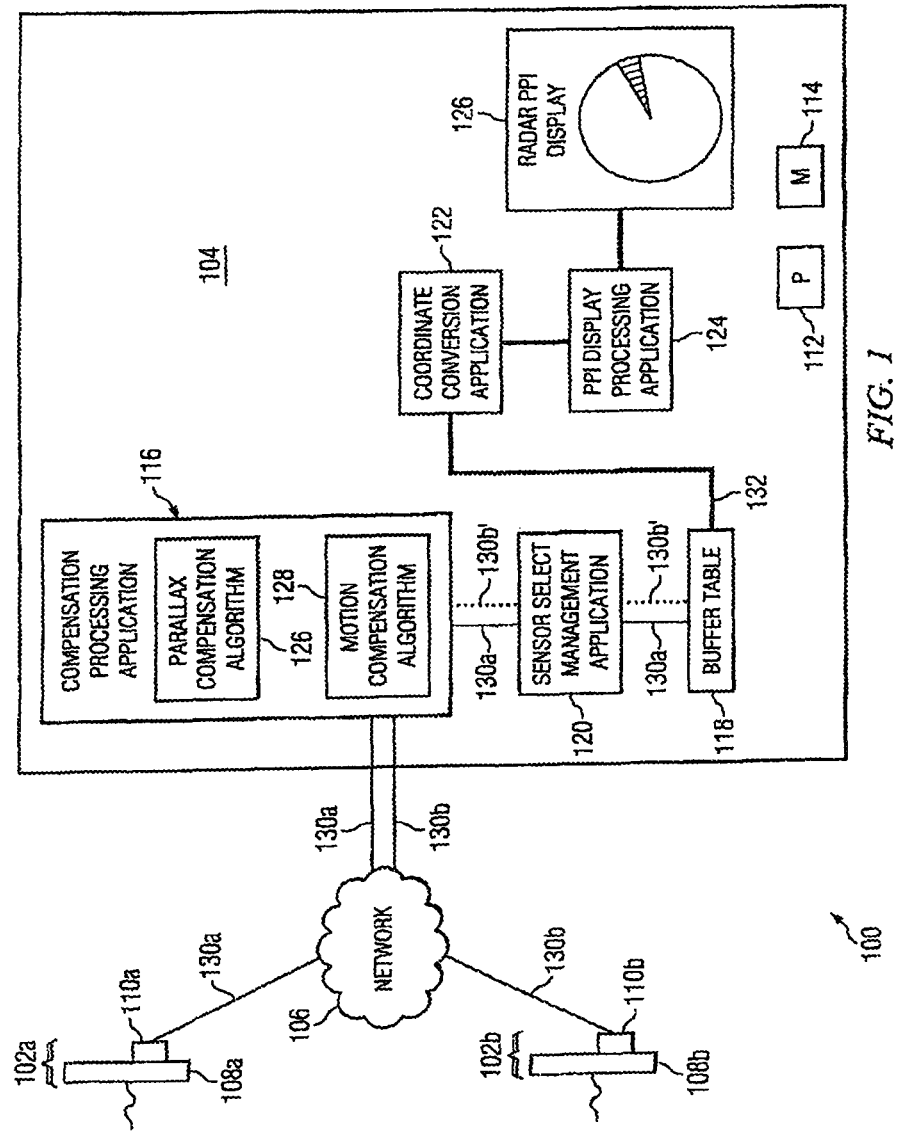
FIG. 1 illustrates an example system for combining data from multiple radar signals on a single PPI display, according to certain embodiments of the present invention.

FIG. 1 illustrates an example system 100 for combining data from multiple radar signals on a single PPI display, according to certain embodiments of the present invention. System 100 may include a plurality of radar devices 102, a radar processing system 104, and network 106. Although this particular implementation of system 100 is illustrated and primarily described, the present invention contemplates any suitable implementation of system 100 according to particular needs.

System 100 may include a first radar device operable to generate first radar signal data and a second radar device operable to generate second radar signal data. In general, system 100 is operable to perform compensation processing on at least a portion of the second radar signal data to form modified second radar signal data that is correlated to the first radar signal data. The first radar signal data and the modified second radar signal data may then be combined to form a combined radar signal data that may be used to generate a display on a single radar PPI display. Generating a display on a single radar PPI display from the combined radar signal data may allow for blind zone elimination (e.g., a full three-hundred sixty degree view may be provided despite blind zones that may be associated with the first and second radar devices) while eliminating the need for multiple radar PPI displays. As a result, the amount of space for radar PPI displays on a ship's crowded bridge may be reduced. Additionally, target tracking may be performed based on the combined radar signal data, eliminating track handoff problems associated with combining target track data associated with data from separate radar signals on a single radar PPI display.

Radar devices 102 of system 100 may each include a radar antenna 108 and a radar transceiver 110. Radar devices 102 may include any device using electromagnetic wave pulses to identify the range, altitude, direction, and/or speed of moving and/or fixed objects. For example, radar devices 102 may be devices using electromagnetic wave pulses to identify the range, altitude, direction, and/or speed of aircraft, ships, motor vehicles, weather formations, and/or terrain. Although particular radar devices 102 having particular components are illustrated and primarily described, the present invention contemplates any suitable radar devices 102 having any suitable components, according to particular needs.

Radar antenna 108 may be a monostatic antenna operable to emit and receive electromagnetic wave pulses generated by transceiver 110. Transceiver 110 may generate electromagnetic wave pulses having a particular frequency. As a particular example, a transceiver 110 of an X-band radar device 102 may generate electromagnetic wave pulses within the frequency range of 9300-9500 MHz. As another particular example, a transceiver 110 of an S-band radar device 102 may generate electromagnetic wave pulses within the frequency range of 2900-3100 MHz. Transceiver 110 may generate electromagnetic wave pulses at a particular rate (e.g., 1000 pulses per second, corresponding to a pulse repetition frequency (PRF) of 1 kHz), and the generated electromagnetic wave pulses may be emitted via radar antenna 108 as antenna 108 rotates at a particular scan rate (e.g., between twelve and sixty revolutions per minute (RPM)). Thus, as radar antenna 108 rotates at the particular scan rate, radar antenna 108 emits electromagnetic wave pulses generated by transceiver 110 in a particular direction at a particular time.

A radar device 102 may have an associated maximum range (e.g., ninety six miles), the maximum range corresponding to the maximum distance from the radar device 102 that an object may be detected based on the reflection of the electromagnetic wave pulse emitted via antenna 108. The maximum range of radar device 102 may depend on the frequency of the electromagnetic wave pulses generated by transceiver 110.

As the electromagnetic wave pulses emitted via antenna 108 reflect off objects (e.g., land, ships, buoys), the electromagnetic waves may return to antenna 108 (radar antenna 108 being operable to receive the reflected electromagnetic wave pulses, as described above). Each electromagnetic wave pulse reflection received by antenna 108 may have a signal strength corresponding to the amount of energy of the emitted electromagnetic wave pulse reflected by the object. As a result, transceiver 110 may be operable to determine a strength for an electromagnetic wave pulse reflection based on the amount of energy associated with the electromagnetic wave pulse reflections received by antenna 108.

Furthermore, transceiver 110 may be operable to determine a polar coordinate location (range and azimuth angle) associated with an electromagnetic wave pulse reflection corresponding to a particular object. For example, transceiver 110 may be operable to determine a range for the particular object by calculating the time interval between the time at which the electromagnetic pulse is emitted by antenna 108 and the time at which reflected electromagnetic pulse is received by antenna 108. Additionally, transceiver 110 may be operable to determine an azimuth angle for the particular object based on the direction that the electromagnetic wave pulse reflected by the particular objects was emitted by antenna 108.

Thus, as antenna 108 rotates, transceiver 110 may generate analog radar signal data including a plurality of voltages corresponding to a plurality of objects reflecting the electromagnetic wave pulses emitted via antenna 108 (the voltages being determined, for example, based on the strength of the reflected electromagnetic wave pulse). Furthermore, each voltage of the analog radar signal data may have an associated polar coordinates location (i.e., a range and azimuth angle).

Transceiver 110 may be further operable to convert the analog radar signal data to digital radar signal data (e.g., radar signal data 130). Although radar transceiver 110 is illustrated and primarily described as converting the analog radar signal data to digital radar signal data, the present invention contemplates the conversion being performed by any suitable component (e.g., am analog to digital converter), according to particular needs). In certain embodiments, radar signal data 130 is a full fidelity radar signal; however, the invention is not intended to be so limited. Transceiver 110 may be further operable to communicate radar signal data 130 to radar processing system 104 via network 106.

Figure 2A:
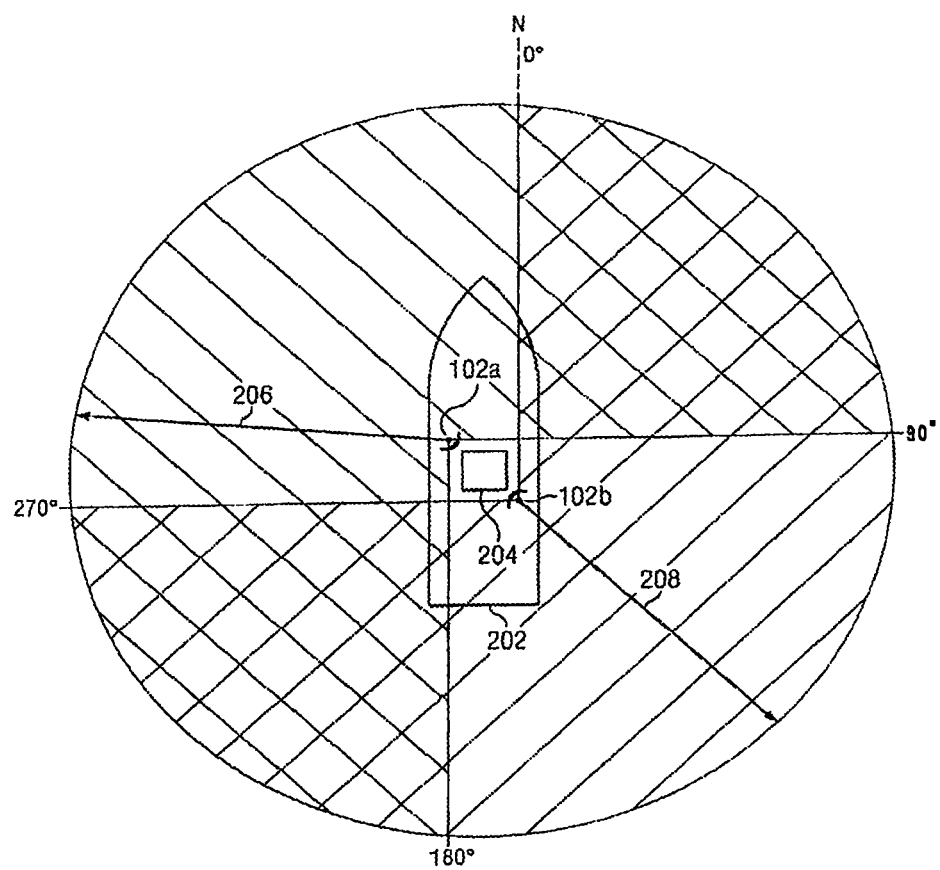
FIGS. 2A-2C illustrate a ship having components of an example system for combining data from multiple radar signals on a single PPI display, according to certain embodiments of the present invention.
Figure 2B:
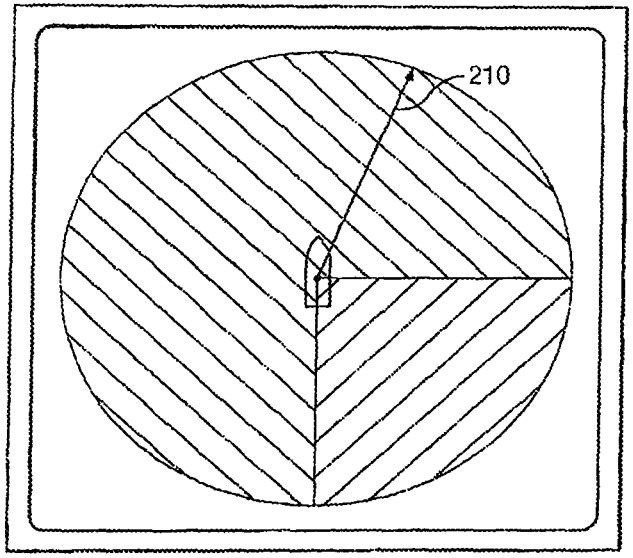
Figure 2C:
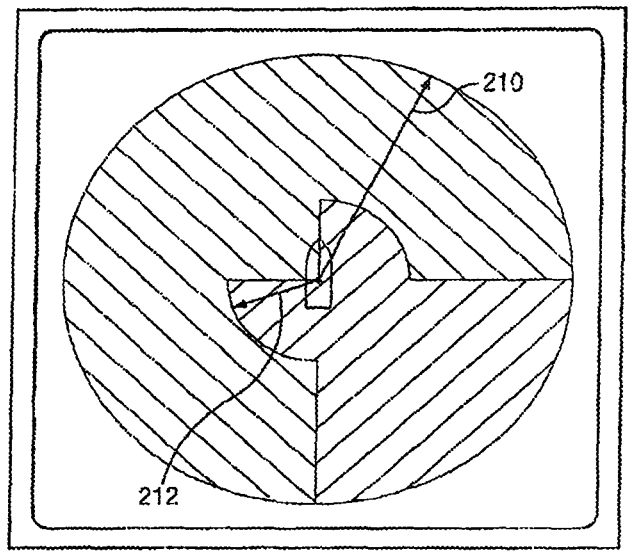
Figure 3A:
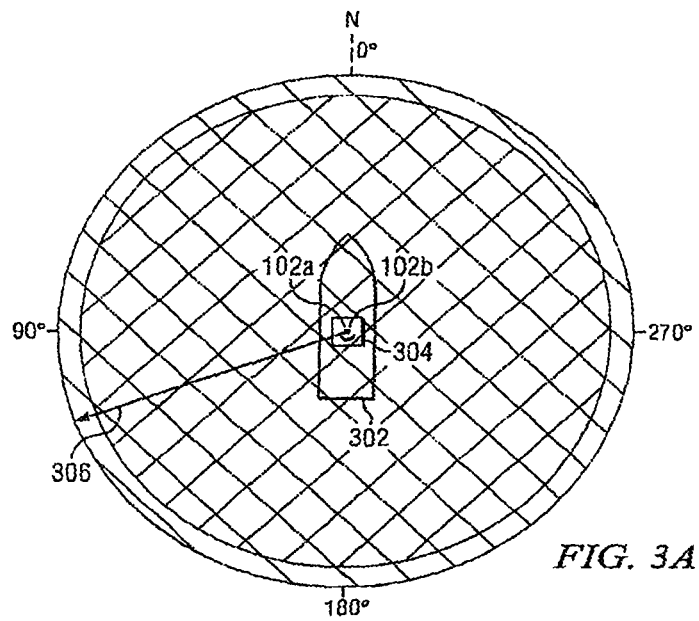
FIGS. 3A-3B illustrate an example ship having components of an example system combining data from multiple radar signals on a single PPI display, according to certain embodiments of the present invention.
Figure 3B:
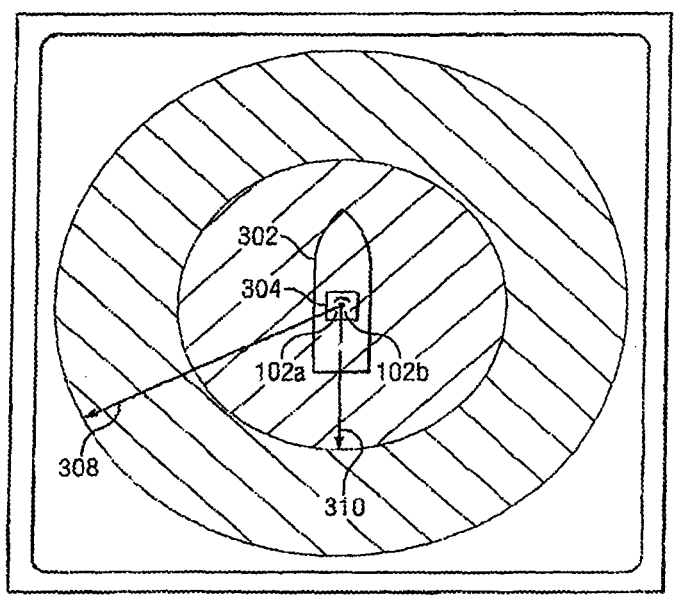

In certain embodiments, system 100 includes a first radar device 102a (having a first radar antenna 108a and a first radar transceiver 110a) and a second radar device 102b (having a first radar antenna 108a and a first radar transceiver 110a). Additionally, system 100 may be installed on a commercial ship, with first radar device 102a and second radar device 102b being located either at different locations on the ship (e.g., as depicted in FIGS. 2A-2C, below) or at the same location on the ship (e.g., as depicted in FIGS. 3A-3B, below). Although system 100 is illustrated and primarily described as having two radar devices 102 (first radar device 102a and second radar device 102b), the present invention contemplates system 100 having any suitable number of radar devices 102, according to particular needs. Furthermore, although system 100 is illustrated an primarily described as being installed on a commercial ship, the present invention contemplates system 100 being installed at any suitable location (e.g., on land, on an aircraft), according to particular needs.

First radar device 102a and second radar device 102b may each have an associated angular range of visibility ranging from zero to three hundred sixty degrees (examples of which are illustrated in FIGS. 2A and 3A). The angular range of visibility of a radar device 102 may be measured in terms of an azimuth angle (angle relative to true north as measured by a compass such as the ship compass). The angular range of visibility of a radar device 102 may be limited by one or more blind zones. A blind zone is a particular angular range across which electromagnetic wave pulses emitted by antenna 108 are impeded such that they do not reach the maximum range associated with radar device 102. A blind zone resulting from electromagnetic wave pulses emitted by antenna 108 being impeded may be caused, for example, by ship structures (e.g., a ship mast or ship deckhouse structures).

As a particular example, first radar device 102a and second radar device 102b may located at different locations on a commercial ship (e.g., as depicted in FIG. 2A). With the ship bearing being true north, first radar device 102a may have a blind zone from ninety to one-hundred eighty degrees resulting from the ship deck house (as depicted in FIG. 2A), and second radar device 102b may have a blind zone from two-hundred seventy to three-hundred sixty degrees resulting from the ship deck house (as depicted in FIG. 2A). As a result, first radar device 102a and second radar device 102b will have overlapping angular ranges of visibility from zero to ninety degrees and from one-hundred eighty to two-hundred seventy degrees.

The particular range of azimuth angles of a blind zone associated with a particular radar device 102 caused by a ship structure may be dependant on the bearing of the ship. As described above, blind zones are measured as a range of azimuth angles (i.e., angle with respect to true north). As a ship changes bearing with respect to true north, the ship structure causing the blind zone also changes bearing with respect to true north. As a result, the range of azimuth angles of the blind zone associated with a radar device 102 may be dependant on the bearing of the ship. For example, if the ship depicted in FIG. 2A had a bearing of due west rather than due north, first radar device 102a would have a blind zone for azimuth angles in the range of zero to ninety degrees rather than in the range of ninety to one-hundred eighty degrees.

Additionally, first radar device 102a and second radar device 102b may be dissimilar. As a particular example, first radar device 102a may be an X-band radar device, and second radar device 102b may be an S-band radar device. X-band radar devices typically transmit electromagnetic wave pulses within the frequency range of 9300-9500 MHz and typically provide high resolution. However, X-band radar devices may be heavily affected by sea or rain clutter. S-band radar devices typically transmit electromagnetic wave pulses within the frequency range of 2900-3100 MHz and typically provide lower resolution with superior rain penetration.

First radar device 102a and second radar device 102b may be coupled to radar processing system 104 via network 106. For example, transceiver 110a of first radar device 102a may be operable to communicate first radar signal data 130a (e.g., including polar coordinate location of one or more objects reflecting electromagnetic wave pulses within the angular range of visibility of antenna 108a) to radar processing system 104 via network 106, and transceiver 110b of second radar device 102b may be operable to communicate second radar signal data 130b (e.g., including polar coordinate location of one or more objects reflecting electromagnetic wave pulses within the angular range of visibility of antenna 108b) to radar processing system 104 via network 106.

Network 106 facilitates wireless or wireline communication. Network 106 may communicate, for example, IP packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations. Radar processing system 104 may include one or more computer systems operating at one or more locations. The one or more computer systems may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of radar processing system 104. Radar processing system 104 may include a personal computer, workstation, network computer, kiosk, wireless data port, personal data assistant (PDA), one or more processors within these or other devices, or any other suitable processing device.

"Radar processing system 104" and "user of radar processing system 104" may be used interchangeably. A user of radar processing system 104 may include, for example, a human user or a computer program or other suitable software module for automatically interacting with radar processing system 104. A particular example user of radar processing system 104 includes a radar operator/navigator of a commercial ship.

Radar processing system 104 may further include a processing module 112, a memory module 114, a compensation processing application 116, a buffer table 118, a sensor select management application 120, a coordinate conversion application 122, a PPI display processing application 124, and a radar PPI display 126. Although certain functionality is described below as being associated with one or more applications of radar processing system 104, the present invention contemplates the functionality associated the with one or more applications of radar processing system 104 being combined or separated among any suitable number of applications according to particular needs.

Processing module 112 may include one or more microprocessors, controllers, or any other suitable computing devices or resources. Processing module 112 may work, either alone or with other components of system 100, to provide the functionality of system 100 described herein.

Memory module 114 may take the form of volatile or non-volatile memory including, without limitation, magnetic media, optical media, random access memory RAM, ROM, removable media, or any other suitable memory component.

Compensation processing application 116 of radar processing system 104 may be operable to receive first radar signal data 130a generated by first radar device 102a and second radar signal data 130b generated by second radar device 102b. Compensation processing application 116 may be further operable to perform compensation processing on at least a portion of second radar signal data 130b to form modified second radar signal data 130b' that is correlated to first radar signal data 130a. Although compensation processing application 116 is depicted and primarily described as receiving first radar signal data 130a from first radar device 102a and second radar signal data 130b from second radar device 102b, the present invention contemplates compensation processing application 116 receiving additional radar signal data from any suitable number of additional radar devices 102. Furthermore, although compensation processing application 116 is depicted and primarily described as performing compensation processing on second radar signal data 130b to form modified second radar signal data 130b' that is correlated to first radar signal data 130a, the present invention contemplates compensation processing application 116 performing compensation processing on additional radar signal data from any suitable number of additional radar devices 102 to form additional modified radar signal data that is correlated to first radar signal data 130a.

For example, compensation processing application 116 may perform compensation processing on second radar signal data 130b to form modified second radar signal data 130b' by applying one or more of parallax compensation algorithm 126 and motion compensation algorithm 128 to second radar signal data 130b. Although parallax compensation algorithm 126 and motion compensation algorithm 128 are depicted as being stored in compensation processing application 116, the present invention contemplates parallax compensation algorithm 126 and motion compensation algorithm 128 being stored at any suitable location in radar processing system 104. Additionally, although compensation processing application 116 is primarily described as performing compensation processing on second radar signal data 130b by applying parallax compensation algorithm 126 and motion compensation algorithm 128, the present invention contemplates compensation processing application 116 performing compensation processing on second radar signal data 130b by applying any suitable combination of parallax compensation algorithm 126, motion compensation algorithm 128, and any other suitable algorithm. As described above, first radar device 102a and second radar device 102b may be located at different locations on a commercial ship (e.g., as depicted in FIG. 2A). Due at least in part to the distance between first radar device 102a and second radar device 102b, the azimuth angle corresponding to a particular object (e.g., another ship) in radar signal data 130b (as determined by second radar device 102b) may be different than the azimuth angle corresponding to the same object (e.g., the other ship) in radar signal data 130a (as determined by first radar device 102a). Radar signal data 130a, however, may not include an azimuth angle corresponding to the particular object as the particular object may fall in a blind zone of radar device 102a. This difference in azimuth angle corresponding to a particular object in radar signal data 130b and radar signal data 130a may be referred to as "parallax error." Parallax error may increase the closer the particular object is to the ship.

As described in further detail below, first radar signal data 130a and modified second radar signal data 130b' may be combined in a buffer table 118 to form combined radar signal data 132. To facilitate this combination, it may be desirable to perform compensation processing on second radar signal data 130b such that modified second radar signal data 130b' correlates to first radar signal data 130a. For example, it may be desirable to apply parallax compensation algorithm 126 to second radar signal data 130b such that the azimuth angles of the modified second radar signal data 130b' correlate to the azimuth angles of first radar signal data 130a. In other words, parallax compensation algorithm 126 may modify the azimuth angles of second radar signal data 130b such that the azimuth angles of modified second radar signal data 130b' are the azimuth angles that would have been measured if second radar device 102b were located in at the same location on the ship as first radar device 102a. In embodiments in which first radar device 102a and second radar device 102b are located at the same location on a ship (e.g., as depicted in FIG. 3A), it may not be necessary to apply parallax compensation algorithm 126 to second radar signal data 130b (i.e., if there is no distance between first radar device 102a and second radar device 102b, there will be no parallax error for which to compensate).

Parallax compensation algorithm 126 may include any suitable algorithm (or combination of algorithms) that, when applied to second radar signal data 130b, modifies the azimuth angles of second radar signal data 130b such that the azimuth angles of modified second radar signal data 130b' are the azimuth angles that would have been measured if second radar device 102b were located in at the same location on the ship as first radar device 102a.

In certain embodiments, first radar antenna 108a of first radar device 102a and second radar antenna 108b of second radar device 102b rotate asynchronously. For example, first radar antenna 108a and second radar antenna 108b may rotate asynchronously because first radar antenna 108a and second radar antenna 108b have different scan rates (e.g., first radar antenna 108a may have a scan rate of thirty RPM and radar antenna may have a scan rate of twenty RPM). As another example, even if first radar antenna 108a and second radar antenna 108b have the same scan rate (e.g., twenty RPM), first radar antenna 108a and second radar antenna 108b may still rotate asynchronously because at any particular time antenna 108a may be emitting and receiving electromagnetic wave pulses in a different direction than second radar antenna 108b.

As a result of asynchronous rotation, first radar antenna 108a and second radar antenna 108b may emit and receive electromagnetic wave pulses in the direction of a particular object at different times. Because the ship may move locations between the time antenna 108a emits and receives electromagnetic wave pulses in the direction of the particular object and the time antenna 108b emits and receives electromagnetic wave pulses in the direction of the particular object, the polar coordinate location (range and azimuth) of the particular object in second radar signal data 130b (as measured by second radar device 102b) may not correlate to the polar coordinate location (range and azimuth) of the particular object in first radar signal data 130a (as measured by radar device 108a). Radar signal data 130a, however, may not include a polar coordinate location corresponding to the particular object as the particular object may fall in a blind zone of radar device 102a.

As described in further detail below, first radar signal data 130a and modified second radar signal data 130b' may be combined in a buffer table 118 to form combined radar signal data 132. To facilitate this combination, it may be desirable to perform compensation processing on second radar signal data 130b such that modified second radar signal data 130b' correlates to first radar signal data 130a. More particularly, it may be desirable to apply motion compensation algorithm 128 to second radar signal data 130b (possibly in addition to parallax compensation algorithm 126, described above) such that the azimuth angles and ranges of the modified second radar signal data 130b' correlate to the azimuth angles and ranges of first radar signal data 130a despite the motion of the ship. In other words, motion compensation algorithm 128 modifies the azimuth angles and ranges of second radar signal data 130b such that the azimuth angles and ranges of modified second radar signal data 130b' are those that would have been measured if second radar device 102b had been transmitting electromagnetic wave pulses synchronously with first radar device 102a. More particularly, motion compensation algorithm 128 modifies the azimuth angle and range corresponding to a particular object such that the azimuth angle and range corresponding to the particular object in modified second radar signal data 130b' are the azimuth angle and range that would have been determined if second radar antenna 108b had been transmitting electromagnetic wave pulses in the direction of the object at the same time that first radar antenna 108a was transmitting electromagnetic wave pulses in the direction of the object.

Motion compensation algorithm 128 may be any suitable algorithm (or combination of algorithms) that, when applied to second radar signal data 130b, modifies the azimuth angles and ranges of second radar signal data 130b such that the azimuth angles and ranges of modified second radar signal data 130b' are those that would have been measured if second radar device 102b had been transmitting electromagnetic wave pulses synchronously with first radar device 102a.

Buffer table 118 of radar processing system 104 may be a table that includes a plurality of columns, each column corresponding to a discrete incremental azimuth value between zero and three-hundred sixty degrees (such that the buffer table corresponds to a full three-hundred sixty degree angular range of visibility). For example, buffer table 118 may include 3600 columns, each column representing a 0.1 degree azimuth increment (i.e., buffer table 118 may include columns corresponding to azimuth values of zero degrees, 0.1 degrees, 0.2 degrees, 0.3 degrees, . . . , three-hundred sixty degrees).

Additionally, each column of buffer table 118 may include a plurality of range bins, each range bin corresponding to a incremental linear distance measured from the ship, the incremental linear distance being a value between zero and the range scale of system 100 (as selected by a user and/or designer of radar processing system 104). In other words, each range bin corresponding to a particular column may represent an incremental distance equal to the range scale of system 100 divided by the number of range bins (such that the incremental distance represented by each range bin is dependent on the range scale of system 100).

The range scale of system 100 corresponds to the maximum range from the ship displayed on the radar PPI. The range scale of system 100 may correspond to a incremental distance between a minimum range scale (e.g., 0.75 miles) and the maximum range of first radar device 102a and/or second radar device 102b (e.g. ninety six miles, as described above). For example, a user of radar processing system 104 may select a range scale (using any appropriate input device) of 0.75 miles, 1.5 miles, three miles, six miles, twelve miles, twenty-four miles, forty eight miles, or ninety six miles.

As a particular example, each column of buffer table 118 may have 2400 range bins and the range scale of system 100 (e.g., as selected by a user of radar processing system 104) may be twenty-four miles. As a result, each column of buffer table 118 would include range bins for zero miles, 0.01 miles, 0.02 miles, 0.03 miles . . . , twenty-four miles. As another particular example, each column of buffer table 118 may have 2400 range bins and the range scale of system 100 (e.g., as selected by a user of radar processing system 104) may be forty eight miles. As a result, each column of buffer table 118 would include range bins for zero miles, 0.02 miles, 0.04 miles, 0.06 miles, . . . , forty eight miles.

In other words, each column of buffer table 118 may represent an azimuth angle and each row within each column may represent a distance from the ship such that each column/row combination may correspond to a polar coordinate location (i.e., a particular azimuth angle at a particular distance). Thus, in certain embodiments, buffer table 118 as a whole may include all polar coordinate locations for a three-hundred sixty degree angular range of visibility out to a distance equal to the range scale of system 100.

In certain embodiments, system 100 includes sensor select management application 120. Sensor select management application 120 may receive first radar signal data 130a and modified second radar signal data 130b'. Sensor select management application 120 may be operable to determine which range bins of buffer table 118 that will be populated based on data from first radar signal data 130a (i.e., the digital data corresponding to the strength of the electromagnetic wave pulse reflection received by first antenna 108a). Sensor select management application 120 may be further operable to determine which range bins of buffer table 118 will be populated based on data from modified second radar signal data 130b' (i.e., the digital data corresponding to the strength of the electromagnetic wave pulse reflection received by first antenna 108a).

As described above, compensation processing application 116 may have performed compensation processing on second radar signal data 130b such that modified second radar signal data 130b' correlates to first radar signal data 130a (i.e., the azimuth angles and ranges as measured by second radar device 102b reflected in modified second radar signal data 130b' are those that would have been measured by second radar device 102b had second radar device been co-located and rotating synchronously with first radar device 102a). As a result of second radar signal data 130b' being correlated to first radar signal data 130a, sensor select management application 120 may combine first radar signal data 130a and modified second radar signal data 130b' in buffer table 118 in any suitable manner to generate combined radar signal data 132.

For example, in certain embodiments, buffer table 118 corresponds to a three-hundred sixty degree angular range of visibility to a distance equal to the range scale of system 100, as described above. However, first radar signal data 130a and modified second radar signal data 130b' may not, individually, contain data corresponding to a full three-hundred sixty degree angular range of visibility (due to one or more blind zones of first radar device 102a and/or second radar device 102b). As a result, sensor select management application 120 may populate range the bins of columns of buffer table 118 corresponding to azimuth angles falling in the blind zone of radar device 102a with data from modified second radar signal data 130b'. Similarly, sensor select management application 120 may populate the range bins of columns of buffer table 118 corresponding to azimuth angles falling in the blind zone of radar device 102b with data from first radar signal data 130a.

As a particular example, first radar device 102a and second radar device 102b may be located at different locations on a commercial ship (e.g., as depicted in FIG. 2A). Furthermore, the angular range of visibility of first radar device 102a may include a blind zone from ninety to one-hundred eighty degrees (e.g., resulting from the ship deck house) and the angular range of visibility of second radar device 102b may include a blind zone from two-hundred seventy to three-hundred sixty degrees (e.g., resulting from the ship deck house) such that first radar device 102a and second radar device 102b have overlapping angular ranges of visibility from zero to ninety degrees and from one-hundred eighty to two-hundred seventy degrees (as depicted in FIG. 2A). In other words, first radar signal data 130a will not contain any data corresponding to electromagnetic wave pulse reflections for objects having azimuth angles from ninety to one-hundred eighty degrees and second radar signal data 130b (as well as modified second radar signal data 130b') will not contain any data corresponding to electromagnetic wave pulse reflections for objects having azimuth angles from two-hundred seventy to three-hundred sixty degrees.

In this scenario, sensor select management application 120 may populate the range bins of columns of buffer table 118 corresponding to azimuth values in the range of two-hundred seventy to three-hundred sixty degrees (corresponding to the blind zone of second radar device 102b) with data from first radar signal data 130a (as depicted in FIG. 2B). Similarly, sensor select management application 120 may populate the range bins of columns of buffer table 118 corresponding to azimuth values in the range of ninety to one-hundred eighty degrees (corresponding to the blind zone of first radar device 102a) with data from modified second radar signal data 130b' (as depicted in FIG. 2B). Sensor select management application 120 may fill the remaining range ins of columns of buffer table 118 (corresponding to azimuth angles for which first radar device 102a and second radar device 102b have overlapping angular ranges of visibility) with either data from first radar signal data 130a or data from modified second radar signal data 130b'. For example, sensor select management application 120 may populate the range bins of the remaining columns of buffer table 118 with data from first radar signal data 130a (as depicted in FIG. 2B).

Additional particular examples of combinations of first radar signal data 130a and modified second radar signal data 130b' in buffer table 118 performed by sensor select management application 120 are described in further detail below with regard to FIGS. 2-3.

Coordinate conversion application 122 of radar processing system 104 may access the data contained in buffer table 118 as populated by sensor select management application 120 (i.e., combined radar signal data 132). As described above, the data contained in buffer table 118 (i.e., combined radar signal data 132) may correspond to any suitable combination of first radar signal data 130a and modified second radar signal data 130b'. For example, combined radar signal data 132 may include digital data corresponding to the strength of the electromagnetic wave pulse reflections for polar coordinate locations corresponding to a three-hundred sixty degree angular range of visibility to a distance equal to the range scale of system 100 (as buffer table 118 may contain columns corresponding to azimuth angles ranging from zero to three-hundred sixty degrees, each column having a plurality of range bins corresponding to linear distances from the ship ranging from zero to the range scale of system 100).

In certain embodiments, radar PPI display 126 is a raster scan monitor having a plurality of pixels, each pixel having an associated location in Cartesian coordinates. For example, radar PPI display 126 may be a CRT display, an LCD monitor, or a plasma monitor. To allow the appropriate pixels of radar PPI display 126 to be painted based on the data associated with combined radar signal data 132, coordinate conversion application 122 may be operable to covert the polar coordinate locations of combined digital radar signal data 132 to Cartesian coordinate locations corresponding to one or more pixels of radar PPI display 126.

For example, combined radar signal data 132 may include digital data corresponding to the strength of a particular electromagnetic wave pulse reflection received from an object at a particular polar coordinate location (e.g., a particular azimuth angle at a particular range). To paint the appropriate pixel on radar PPI display 126 corresponding to the object, the polar coordinate location associated with the data may be converted to Cartesian coordinate data (i.e., a horizontal distance and a vertical distance) associated with one or more pixels of radar PPI display 126.

Although coordinate conversion application 122 is depicted and primarily described as performing the above-described coordinate conversion on combined radar signal data 132 (i.e., data accessed from buffer table 118), the present invention contemplates coordinate conversion application 122 performing the above-described coordinate conversion on any suitable radar signal data. For example, coordinate conversion application 122 may perform the above-described coordinate conversion on first radar signal data 130a and modified second radar signal data 130b' such that each columns/row combination of buffer table 118 correspond to a Cartesian coordinate location of one or more pixels of radar PPI display 126 (rather than polar coordinate location, as described above).

PPI display processing application 124 of radar processing system 104 may receive combined radar signal data 132 (combined radar signal data 132 having been converted from polar coordinates to Cartesian coordinates by coordinate conversion application 122, as described above). PPI display processing application 124 may be operable to perform display processing on combined radar signal data 132.

PPI display processing application 124 may perform display processing on combined radar signal data 132 by performing target tracking on combined radar signal data 132. For example, PPI display processing application 124 may be operable to identify one or more trackable discrete entities within combined radar signal data 132. A trackable discrete entity may be identified by applying one or more thresholding algorithms to combined radar signal data 132 to identify a high energy return having small spatial content (i.e., data corresponding to a strong electromagnetic wave pulse reflection from a small area), which may be consistent with a buoy or another ship (as opposed to land).

Having identified a trackable discrete entity, PPI display processing application 124 may be further operable to determine the center location (in Cartesian coordinates) of the trackable discrete entity. PPI display processing application 124 may then communicate the determined center location to a tracking filter (e.g., a Kalman filter). The tracking filter may keep track of identified trackable discrete entities over time such that the tracking filter may determine a velocity vectors associated with the trackable entities. The velocity vectors determined by the tracking filter may be associated with the trackable discrete entities identified in combined radar signal data 132 such that the velocity vectors may be displayed along with the trackable discrete entities on radar PPI display 126.

Additionally, PPI display processing application 124 may perform display processing on combined radar signal data 132 by performing clutter reduction on combined radar signal data 132.

PPI display processing application 124 may communicate combined radar signal data 132 to PPI display 126. PPI display 126 may be operable to generate a display corresponding to combined radar signal data 132. For example, a graphics card of radar PPI display 126 may receive combined radar signal data 132. As described above, combined radar signal data 132 may include digital data corresponding to a plurality of electromagnetic wave pulse reflections, the strength associated with each reflection, and a Cartesian coordinate location of one or more pixels of radar PPI display 126 associated with each reflection. Combined radar signal data 132 may further include one or more identified trackable discrete entities having an associated velocity vector. The graphics card of radar PPI display 126 may illuminate the plurality of pixels of radar PPI display 126 based on combined radar signal data 132.

FIG. 1 merely provides one example of computers that may be used with the invention. The present invention contemplates computers other than general purpose computers as well as computers without conventional operating systems. As used in this document, the term "computer" is intended to encompass a personal computer, workstation, network computer, a portable computing device, or any other suitable processing device. Furthermore, each computer system of system 100 may include one or more processing modules and one or more memory modules. A processing module may include one or more microprocessors, controllers, or any other suitable computing devices or resources. Processing modules may work, either alone or with other components of system 100, to provide the functionality of system 100 described herein. Each memory module may take the form of volatile or non-volatile memory including, without limitation, magnetic media, optical media, RAM, ROM, removable media, or any other suitable memory component.

Although a particular number components of system 100 have been illustrated and primarily described, the present invention contemplates system 100 including any suitable number of such components. Furthermore, the various components of system 100 described above may be local or remote from one another and may be implemented in any suitable combination of hardware, firmware, and software.

In operation of an example embodiment, first radar device 102*a* generates first radar signal data 130*a* and second radar device 102*b* generates second radar signal data 130*b*, first radar signal data 130*a* and second radar signal data 130*b* comprising digital data corresponding to electromagnetic wave pulse reflections and polar coordinate locations associated with the data. Compensation processing application 116 of radar processing system 104 receives first radar signal data 130*a* and second radar signal data 130*b* and performs compensation processing on second radar signal data 130*b* to generate modified second radar signal data 130*b*' that is correlated to first radar signal data 130*a*. For example, compensation processing application 116 may perform compensation processing on second radar signal data 130*b* by applying parallax compensation algorithm 126 and motion compensation algorithm 128 to second radar signal data 130*b* to form modified second radar signal data 130*b*'.

More particularly, to facilitate the combination of first radar signal data 130*a* and modified second radar signal data 130*b*' in buffer table 118, compensation processing application 116 may apply parallax compensation algorithm 126 to second radar signal data 130*b* such that the azimuth angles of the modified second radar signal data 130*b*' correlate to the azimuth angles of first radar signal data 130*a*. In other words, parallax compensation algorithm 126 modifies the azimuth angles of second radar signal data 130*b* such that the azimuth angles of modified second radar signal data 130*b*' are those that would have been measured if second radar device 102*b* were located in at the same location on the ship as first radar device 102*a*.

Additionally, to further facilitate the combination of first radar signal data 130*a* and modified second radar signal data 130*b*' in buffer table 118, compensation processing application 116 may apply motion compensation algorithm 128 to second radar signal data 130*b* (in addition to parallax compensation algorithm 126, described above) such that the azimuth angles and ranges of modified second radar signal data 130*b*' correlate to the azimuth angles and ranges of first radar signal data 130*a* despite the motion of the ship. In other words, motion compensation algorithm 128 modifies the azimuth angles and ranges of second radar signal data 130*b* such that the azimuth angles and ranges of modified second radar signal data 130*b*' are those that would have been measured if second radar device 102*b* had been transmitting electromagnetic wave pulses synchronously with first radar device 102*a*.

Sensor select management application 120 of radar processing system 104 may combine at least a portion of first radar signal data 130*a* with at least a portion of modified second radar signal data 130*b*' in buffer table 118 to form combined radar signal data 132. For example, sensor select management application 120 may populate the range bins of the columns of buffer table 118 corresponding to azimuth values in the range corresponding to the blind zone of second radar device 102*b* with data from first radar signal data 130*a*. Similarly, sensor select management application 120 may populate the range bins of the columns of buffer table 118 corresponding to azimuth angles in the range corresponding to the blind zone of first radar device 102*a* with data from modified second radar signal data 130*b*'. Sensor select management application 120 may populate the range bins of the remaining columns of buffer table 118 (corresponding to azimuth angles for which first radar device 102*a* and second radar device 102*b* have overlapping angular ranges of visibility) with either data from first radar signal data 130*a* or modified second radar signal data 130*b*'.

Coordinate conversion application 122 may access the data stored in buffer table 118 (i.e., combine radar signal data 132) and converts the data from polar coordinates to Cartesian coordinates. More particularly, because radar PPI display 126 of radar processing system 104 may be a raster scan monitor having a plurality of pixels (each pixel having an associated location in Cartesian coordinates), coordinate conversion application 122 coverts the polar coordinate location for each piece of digital data corresponding to the strength of an electromagnetic wave pulse reflection (i.e., the value in each range bin of buffer table 118) to a Cartesian coordinate location such that the appropriate pixels of radar PPI display 126 may painted.

PPI display processing application 124 of radar processing system 104 may perform display processing on combined radar signal data 132. For example, PPI display processing application 124 may perform display processing on combined radar signal data 132 by performing target tracking on combined radar signal data 132 by identifying one or more trackable discrete entities within combined radar signal data 132. Having identified a trackable discrete entity, PPI display processing application 124 may be further operable to determine the center location (in Cartesian coordinates) of the trackable entity and communicate the determined center location to a tracking filter (e.g., a Kalman filter). The tracking filter may keep track of identified trackable discrete entities over time such that the tracking filter may determine velocity vectors associated with the trackable discrete entities. The velocity vectors determined by the tracking filter may be associated with the trackable discrete entities identified in combined radar signal data 132 such that the velocity vectors may be displayed along with the trackable discrete entities on radar PPI display 126.

A display is may be generate on radar PPI display 126 based on combined radar signal data 132. For example, a graphics card of radar PPI display 126 may receive combined radar signal data 132, which may include digital data corresponding to a plurality of electromagnetic wave pulse reflections, the strength associated with each reflection, the Cartesian coordinate location of each reflections, and one or more identified trackable discrete entities having associated velocity vectors. The graphics card of radar PPI display 126 may illuminate the plurality of pixels of radar PPI display 126 based on combined radar signal data 132 (i.e., one or more pixels associated with a particular Cartesian coordinate location may be illuminated according to the digital data of combined radar signal data 132 associated with that Cartesian coordinate location).

Certain embodiments of the present invention may provide one or more technical advantages. Ships are often required to carry at least two radar devices to leave port. As a result of this requirement, such ships often carry two separate radar devices. Each radar device may suffer from one or more blind zones resulting from ship structures (e.g., a ship mast). Conventional techniques for eliminating blind zones (i.e., providing a full three-hundred sixty degree, or at least an improved, angular range of visibility to a radar operator/navigator) may include providing two separate PPI displays, one PPI display generated based on the radar signal from each of the two separate radar devices. Having two separate PPI displays may be undesirable, however, as it is not an optimal use of display space on a ships crowded bridge.

Combining the data from radar signals from multiple radar devices 102 into a single buffer table 118 to generate combined radar signal data 132 may allow for the generation of a PPI display based on the combined radar signal data. Generating a PPI display based on the combined radar signal data may reduce or eliminate blind zones associated with each radar device (e.g., a full three-hundred sixty degree view may be provided despite the blind zones associated with the individual radar devices) while eliminating the need for multiple radar PPI displays 126 (one for each radar device, as used with certain conventional techniques). As a result, the amount of space for radar PPI displays 126 on a ship's crowded bridge may be reduced.

Conventional techniques may further include displaying target tracks associated with data from each radar signal on a single PPI display such that a radar operator/navigator may view the full track picture on the single PPI display. However, because the target tracks are associated with data from separate radar signals, track handoff must be performed as a target moves from being tracked by one radar device to being tracked by the other radar device. Track handoff, however, is often inaccurate, particularly as a large target moves from being tracked by one radar device to being tracked by the other radar device at relatively close range.

Combining data from multiple radar signals generated by multiple radar devices 102 into a single buffer table 118 to generate combined radar signal data and performing tracking based on the combined radar signal data may allow a radar operator/navigator to view the full track picture on a single radar PPI display 126 while eliminating problems associated with track handoff.

Additionally, a ship may carry two dissimilar radar devices 102. For example, a ship may carry an X-band radar device 102a (high resolution) and an S-band radar device. 102b (high rain penetration). X-band radar devices typically provide high resolution, but X are typically heavily affected by sea or rain clutter. S-Band radar devices typically provide lower resolution than X-band radar devices, but provide superior rain penetration. Combining radar signal data from the X-band radar 102a device with radar signal data from the S-band radar device 102b in a single buffer table 118 to generate combined radar signal data may allow for the generation of a PPI display in which the X-band radar device 102a is utilized to generate the portion of the PPI display for short ranges (for which high resolution is more important and rain penetration is less important) and the S-band radar device 102b is utilized to generate the portion of the PPI display for long ranges (for which high resolution is less important and superior rain penetration more important).

FIGS. 2A-2C illustrate a ship 202 having components of an example system 100 for combining data from multiple radar signals on a single PPI display, according to certain embodiments of the present invention. More particularly, FIG. 2A illustrates an example ship 202 having a first radar device 102a and a second radar device 102b located at different locations on ship 202 along with the angular range or visibility associated with first radar device 102a and a second radar device 102b. FIGS. 2B-2C illustrate example displays on radar PPI display 126 based on different combinations of radar signal data 130a (generated by first radar device 102a) and modified second radar signal data 130b' (generated by second radar device 102b and modified by compensation processing application 116) in buffer table 118.

First radar device 102a may have an associated maximum range 206 corresponding to the maximum distance at which first radar device 102a can locate objects. For example, first radar device 102a may have a maximum range 206 of ninety-six miles. Additionally, the angular range of visibility of first radar device 102a may include a blind zone resulting from ship deck house 204 for azimuth angles from ninety to one-hundred eighty degrees (assuming a ship bearing of due north). In other words, first radar signal data 130a generated by first radar device 102a will not contain any data corresponding to azimuth angles from ninety to one-hundred eighty degrees.

Second radar device 102b may have an associated maximum range 208 corresponding to the maximum distance at which second radar device 102b can locate objects. For example, second radar device 102b may have a maximum range 208 of ninety-six miles. Additionally, the angular range of visibility of second radar device 102b may include a blind zone resulting from ship deck house 204 for azimuth angles from two-hundred seventy to three-hundred sixty degrees (assuming a ship bearing of due north).). In other words, second radar signal data 130b generated by second radar device 102b (as well as modified second radar signal data 130b') will not contain any data corresponding to azimuth angles from two-hundred seventy to three-hundred sixty degrees.

As described above with regard to FIG. 1, sensor select management application 120 may receive first radar signal data 130a (generated by first radar device 102a) and modified second radar signal data 130b' (generated by second radar device 102*b* and modified by compensation processing application 116). Sensor select management application 120 may combine data from the received signals in any suitable manner to generate combined radar signal data 132 (i.e., by populating appropriate portions of buffer table 118 with data from either signal). Combined radar signal data 132 may correspond to a three-hundred sixty degree angular range of visibility (as buffer table 118 contains columns corresponding to azimuth angles from zero to three-hundred sixty degrees) to a distance equal to the range scale 210 of system 100 (which may be less than or equal to the lesser of maximum range 206 of first radar device 102*a* and the maximum range 208 of second radar device 102*b*). However, first radar signal data 130*a* and modified second radar signal data 130*b*' may not, individually, contain data corresponding to a full three-hundred sixty degree angular range of visibility (due to the blind zones of first radar device 102*a* and second radar device 102*b*, described above). In other words, first radar signal 102*a* and modified second radar signal 102*b* may not, individually, contain sufficient data to populate each range bin of each column of buffer table 118.

As a result, sensor select management application 120 may populate the range bins of the columns of buffer table 118 corresponding to azimuth values in the range of two-hundred seventy to three-hundred sixty degrees (corresponding to the blind zone of second radar device 102*b*) with data from first radar signal data 130*a* (as depicted in FIG. 2B-2C). Similarly, sensor select management application 120 may populate the range bins of the columns of buffer table 118 corresponding to azimuth values in the range of ninety to one-hundred eighty degrees (corresponding to the blind zone of first radar device 102*a*) with data from modified second radar signal data 130*b*' (as depicted in FIG. 2B-C). The range bins of the remaining columns of buffer table 102 (corresponding to azimuth angles for which first radar device 102*a* and second radar device 102*b* have overlapping angular range of visibility) may be filled with either data from first radar signal data 130*a* or modified second radar signal data 130*b*'.

For example, sensor select management application 120 may populate the range bins of the remaining columns of buffer table 118 (corresponding to azimuth angles for which first radar device 102*a* and second radar device 102*b* have overlapping angular ranges of visibility) with data from first radar signal data 130*a* (as depicted in FIG. 2B).

Alternatively, sensor select management application 120 may populate the range bins of the remaining columns of buffer table 118 (corresponding to azimuth angles for which first radar device 102*a* and second radar device 102*b* have overlapping angular ranges of visibility) with a combination of data from first radar signal data 130*a* and modified second radar signal data 130*b*' (as depicted in FIG. 2C).

As described above, first radar device 102*a* and second radar device 102*b* may be dissimilar. For example, first radar device 102*a* may be an S-band radar device and second radar device 102*b* may be an X-band radar device. X-band radar devices typically provide high resolution, but may be heavily affected by sea or rain clutter. S-Band radar devices, on the other hand, typically provide lower resolution than X-band radar devices, but may provide superior rain penetration. As a result, it may be beneficial to use data from the X-band device (modified second radar signal data 130*b*' from second radar device 102*b*) in generating a PPI display for areas relatively close to ship 202 (i.e., within a distance 212) while using data from the S-band device (first radar device 102*a*) in generating a PPI display for areas further from ship 202 (i.e., from distance 212 to the range scale 210).

As a particular example (as depicted in FIG. 2C), the range scale 210 of system 100 may be twenty-four miles, and high resolution X-band radar (i.e., second radar device 102*b*) may be heavily affected by rain and sea clutter past a distance 212 equal to five miles. Therefore, for columns of buffer table 118 corresponding to azimuth angles for which first radar device 102*a* and second radar device 102*b* have overlapping angular ranges of visibility (i.e., zero to ninety degrees and one-hundred eighty to two-hundred seventy degrees), sensor select management application 120 may populate range bins corresponding to linear distances from the ship between zero and five miles with data from modified second radar signal data 130*b*' (high resolution X-band signal generated by second radar device 102*b*). Sensor select management application 120 may populate the remaining range bins for columns of buffer table 118 corresponding to azimuth angles for which first radar device 102*a* and second radar device 102*b* have overlapping angular ranges of visibility (i.e., range bins corresponding to linear distances from the ship between five and twenty-four miles) with data from first radar signal data 130*a* (high rain penetration S-band signal generated by first radar device 102*a*).

FIGS. 3A-3B illustrate a ship 302 having components of an example system 100 for combining data from multiple radar signals on a single PPI display, according to certain embodiments of the present invention. More particularly, FIG. 3A illustrates an ship 302 having a first radar device 102*a* and a second radar device 102*b*, first radar device 102*a* and second radar device 102*b* being co-located (e.g., on top of ship deckhouse 304). Furthermore first radar device 102*a* and second radar device 102*b* may each have a three-hundred sixty degree angular range or visibility (to a maximum range 306). FIG. 3B illustrates an example display on radar PPI display 126 based on a combination of radar signal data 130*a* (generated by first radar device 102*a*) and modified second radar signal data 130*b*' (generated by second radar device 102*b* and modified by compensation processing application 116).

As described above with regard to FIG. 1, sensor select management application 120 may receive first radar signal data 130*a* (generated by first radar device 102*a*) and modified second radar signal data 130*b*' (generated by second radar device 102*b* and modified by compensation processing application 116). Sensor select management application 120 may combine data from the received signals in any suitable manner to generate combined radar signal data 132 (i.e., by filling appropriate portions of buffer table 118 with data from either signal).

Combined radar signal data 132 may correspond to a three-hundred sixty degree angular range of visibility (as buffer table 118 contains columns corresponding to azimuth angles from zero to three-hundred sixty degrees) to a distance equal to the range scale 308 of system 100 (which may be less than or equal to maximum range 306 of first radar device 102*a* and second radar device 102*b*). Because first radar signal data 130*a* and modified second radar signal data 130*b*' each contain data corresponding to a full three-hundred sixty degree angular range of visibility, either first radar signal 102*a* or modified second radar signal 102*b* contain sufficient data to populate the entire buffer table 118.

However, because first radar device 102*a* and second radar device 102*b* may be dissimilar, it may be desirable to combine first radar signal data 130*a* and modified second radar signal data 130*b*' despite the fact that either would contain sufficient data to populate the entirety of buffer table 118. For example, first radar device 102*a* may be an S-band radar device (lower resolution but provides superior rain penetration) and second radar device 102*b* may be an X-band radar device (high resolution but are heavily affected by sea or rain clutter). As a result, it may be beneficial to use data from the X-band device (modified second radar signal data 130b' from second radar device 102b) in generating a PPI display for areas relatively close to ship 302 (i.e., within a distance 308) while using data from the S-band device (first radar device 102a) in generating a PPI display for areas further from ship 302 (i.e., from distance 308 to the range scale 306).

As a particular example (as depicted in FIG. 3B), the range scale 306 of system 100 may be twenty-four miles, and high resolution X-band radar (i.e., second radar device 102b) may be heavily affected by rain and sea clutter past a distance 310 equal to five miles. Therefore, for each of the columns of buffer table 118 (corresponding to azimuth angles from zero to three-hundred sixty degrees), sensor select management application 120 may populate range bins corresponding to linear distances from the ship between zero and five miles with data from modified second radar signal data 130b' (high resolution X-band signal generated by second radar device 102b). Sensor select management application 120 may populate the remaining range bins for each of the columns of buffer table 118 (corresponding to linear distances from the ship between five and twenty-four miles) with data from first radar signal data 130a (high rain penetration S-band signal generated by first radar device 102a).

Figure 4:
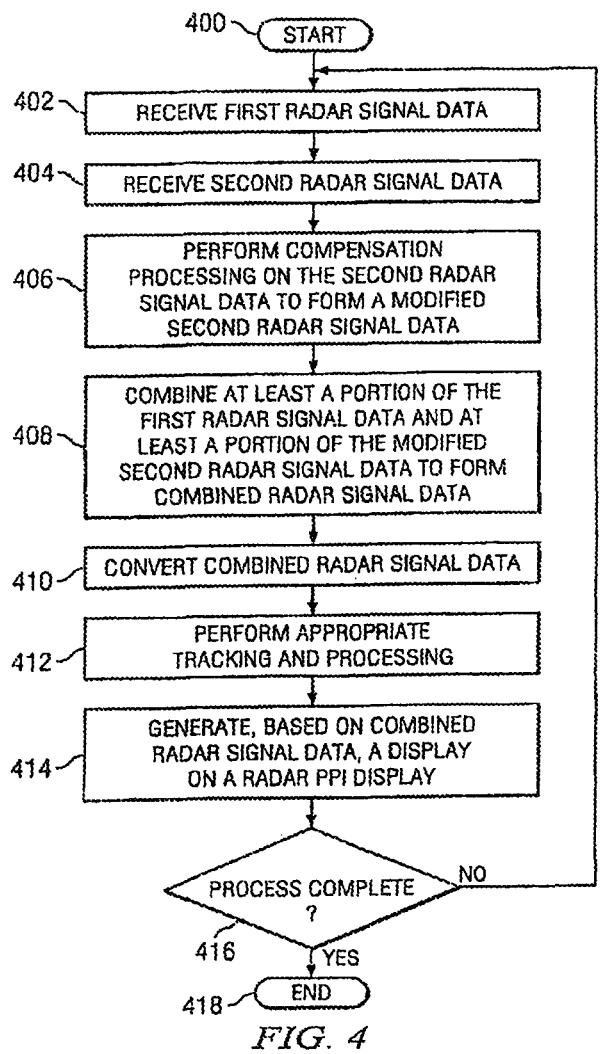
FIG. 4 illustrates an example method for combining data from multiple radar signals on a single PPI display, according to certain embodiments of the present invention.

FIG. 4 illustrates an example method for combining data from multiple radar signals on a single PPI display, according to certain embodiments of the present invention. The method begins at step 400. At step 402, compensation processing application 116 of radar processing system 104 receives first radar signal data 130a, first radar signal data 130a having been generated by first radar device 102a. At step 404, compensation processing application 116 receives second radar signal data 130b, second radar signal data 130b having been generated by second radar device 102b.

At step 406, compensation processing application 116 performs compensation processing on at least a portion of second radar signal data 130b to generate modified second radar signal data 130b' that is correlated to first radar signal data 130a. For example, compensation processing application 116 may perform compensation processing on second radar signal data 130b by applying parallax compensation algorithm 126 and motion compensation algorithm 128 to second radar signal data 130b to form modified second radar signal data 130b'.

More particularly, to facilitate the combination of first radar signal data 130a and modified second radar signal data 130b' in buffer table 118, compensation processing application 116 may apply parallax compensation algorithm 126 to second radar signal data 130b such that the azimuth angles of the modified second radar signal data 130b' correlate to the azimuth angles of first radar signal data 130a. In other words, parallax compensation algorithm 126 modifies the azimuth angles of second radar signal data 130b such that the azimuth angles of modified second radar signal data 130b' are those that would have been measured if second radar device 102b were located in at the same location on the ship as first radar device 102a.

Additionally, to further facilitate the combination of first radar signal data 130a and modified second radar signal data 130b' in buffer table 118, compensation processing application 116 may apply motion compensation algorithm 128 to second radar signal data 130b (in addition to parallax compensation algorithm 126, described above) such that the azimuth angles and ranges of modified second radar signal data 130b' correlate to the azimuth angles and ranges of first radar signal data 130a despite the motion of the ship. In other words, motion compensation algorithm 128 modifies the azimuth angles and ranges of second radar signal data 130b such that the azimuth angles and ranges of modified second radar signal data 130b' are those that would have been measured if second radar device 102b had been transmitting electromagnetic wave pulses synchronously with first radar device 102a.

At step 408, sensor select management application 120 of radar processing system 104 combines at least a portion of first radar signal data 130a with at least a portion of modified second radar signal data 130b' in buffer table 118 to generate combined radar signal data 132. For example, buffer table 118 may correspond to a three-hundred sixty degree angular range of visibility. Furthermore, first radar signal data 130a and modified second radar signal data 130b' may not, individually, contain data corresponding to a full three-hundred sixty degree angular range of visibility (due to blind zones of first radar device 102a and second radar device 102b).

Sensor select management application 120 may populate the range bins of the columns of buffer table 118 corresponding to azimuth values in the range corresponding to the blind zone of second radar device 102b with data from first radar signal data 130a. Similarly, sensor select management application 120 may populate the range bins of the columns of buffer table 118 corresponding to azimuth angles in the range corresponding to the blind zone of first radar device 102a with data from modified second radar signal data 130b'. Sensor select management application 120 may populate the range bins of the remaining columns of buffer table 118 (corresponding to azimuth angles for which first radar device 102a and second radar device 102b have overlapping angular ranges of visibility) with either data from first radar signal data 130a or modified second radar signal data 130b'.

At step 410, coordinate conversion application 122 accesses the data stored in buffer table 118 (i.e., combine radar signal data 132) and converts the data from polar coordinates to Cartesian coordinates. More particularly, because radar PPI display 126 of radar processing system 104 may be a raster scan monitor having a plurality of pixels (each pixel having an associated location in Cartesian coordinates), coordinate conversion application 122 coverts the polar coordinate location for each piece of digital data corresponding to the strength of an electromagnetic wave pulse reflection (i.e., the value in each range bin of buffer table 118) to a Cartesian coordinate location such that the appropriate pixels of radar PPI display 126 may painted.

At step 412, PPI display processing application 124 of radar processing system 104 performs display processing on combined radar signal data 132. PPI display processing application 124 may perform display processing on combined radar signal data 132 by performing target tracking on combined radar signal data 132. For example, PPI display processing application 124 may be operable to identify one or more trackable discrete entities within combined radar signal data 132. A trackable discrete entity may be identified by applying one or more thresholding algorithms to combined radar signal data 132 to identify a high energy return having small spatial content (i.e., data corresponding to a strong reflection from a small area), which may be consistent with a buoy or others ship (as opposed to land).

Having identified a trackable discrete entity, PPI display processing application 124 may be further operable to determine the center location (in Cartesian coordinates) of the trackable discrete entity. PPI display processing application 124 may then communicate the determined center location to a tracking filter (e.g., a Kalman filter). The tracking filter may keep track of identified trackable discrete entities over time such that the tracking filter may determine a velocity vectors associated with the trackable entities. The velocity vectors determined by the tracking filter may be associated with the trackable discrete entities identified in combined radar signal data 132 such that the velocity vectors may be displayed along with the trackable discrete entities on radar PPI display 126.

Additionally, PPI display processing application 124 may perform display processing on combined radar signal data 132 by performing clutter reduction on combined radar signal data 132.

At step 414, a display is generated on radar PPI display based on combined radar signal data 132. For example, a graphics card of radar PPI display 126 may receive combined radar signal data 132, which may include digital data corresponding to a plurality of electromagnetic wave pulse reflections, the strength associated with each reflection, the Cartesian coordinate location of each reflections, and one or more identified trackable discrete entities having an associated velocity vector. The graphics card of radar PPI display 126 may illuminate the plurality of pixels of radar PPI display 126 based on combined radar signal data 132 (i.e., one or more pixels associated with a particular Cartesian coordinate location may be illuminated according to the digital data of combined radar signal data 132 associated with that Cartesian coordinate location).

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

The invention claimed is:

1. A method for combining data from multiple radar signals on a single plan position indicator (PPI) display, comprising:
    receiving, from a first radar device having a first angular range of visibility, first radar signal data corresponding to the first angular range of visibility;
    receiving, from a second radar device having a second angular range of visibility, second radar signal data corresponding to the second angular range of visibility;
    performing compensation processing on at least a portion of the second radar signal data to form modified second radar signal data that is correlated to the first radar signal data by:
        applying motion compensation to the second radar signal data, wherein the motion compensation modifies the azimuth angles and ranges of the second radar signal data such that the azimuth angles and ranges of the modified second radar signal are those that would have been measured if the second radar signal device had been transmitting electromagnetic wave pulses synchronously with the first radar device, and
        applying parallax compensation to the second radar signal data such that the azimuth angle of the modified second radar signal data are the azimuth angles that would have been measured if the second radar device were located at the same location as the first radar device;
    combining at least a portion the first radar signal data with at least a portion of the modified second radar signal data to form combined radar signal data; and
    generating, based on the combined radar signal data, a display on a radar PPI display.

2. The method of claim 1, wherein the combined radar signal data corresponds to a combined angular range of visibility, the combined angular range of visibility being greater than the first angular range of visibility of the first radar device.

3. The method of claim 2, wherein the combined angular range of visibility is three-hundred sixty degrees.

4. The method of claim 1, wherein:
    the first radar signal data corresponding to the first angular range of visibility comprises a plurality of first azimuth values corresponding to the first angular range of visibility, each of the plurality of first azimuth values having an associated plurality of first range values;
    the second radar signal data corresponding to the second angular range of visibility comprises a plurality of second azimuth values corresponding to the second angular range of visibility, each of the plurality of second azimuth values having an associated plurality of second range values; and
    the modified second radar signal data comprises a plurality of modified second azimuth values corresponding to the second angular range of visibility, each of the plurality of modified second azimuth values having an associated plurality of modified second range values.

5. The method of claim 1, wherein combining at least a portion the first radar signal data with at least a portion of the modified second radar signal data to form combined radar signal data comprises:
    storing one or more of a plurality of first azimuth values of the first radar signal data in corresponding columns of a first portion of a buffer table, the buffer table comprising:
        a plurality of columns corresponding to a plurality of azimuth values representing a three-hundred sixty degree angular range of visibility; and
        a plurality of rows corresponding to a plurality of range values; and
    storing one or more of a plurality of modified second azimuth values of the modified second radar signal in corresponding columns of a second portion of the buffer table.

6. The method of claim 1, wherein combining at least a portion the first radar signal data with at least a portion of the modified second radar signal data to form combined radar signal data comprises:
    storing one or more of a plurality of first range values for each of a plurality of first azimuth values of the first radar signal data in corresponding rows of a first portion of a buffer table, the buffer table comprising:
        a plurality of columns corresponding to a plurality of azimuth values representing a three-hundred sixty degree angular range of visibility; and
        a plurality of rows corresponding to a plurality of range values; and
    storing one or more of a plurality of modified second range values for each of a plurality modified second azimuth values in corresponding rows of a second portion of the buffer table.

7. A system for combining data from multiple radar signals on a single PPI display, comprising:
    one or more processing units operable to:
        receive, from a first radar device having a first angular range of visibility, first radar signal data corresponding to the first angular range of visibility;
        receive, from a second radar device having a second angular range of visibility, second radar signal data corresponding to the second angular range of visibility;

perform compensation processing on at least a portion of the second radar signal data to form modified second radar signal data that is correlated to the first radar signal data by:
  applying motion compensation to the second radar signal data, wherein the motion compensation modifies the azimuth angles and ranges of the second radar signal data such that the azimuth angles and ranges of the modified second radar signal are those that would have been measured if the second radar signal device had been transmitting electromagnetic wave pulses synchronously with the first radar device, and
  applying parallax compensation to the second radar signal data such that the azimuth angle of the modified second radar signal data are the azimuth angles that would have been measured if the second radar device were located at the same location as the first radar device;
combine at least a portion the first radar signal data with at least a portion of the modified second radar signal data to form combined radar signal data; and
generate, based on the combined radar signal data, a display on a radar PPI display.

8. The system of claim 7, wherein the combined radar signal data corresponds to a combined angular range of visibility, the combined angular range of visibility being greater than the first angular range of visibility of the first radar device.

9. The system of any of claim 8, wherein the combined angular range of visibility is three-hundred sixty degrees.

10. The system of claim 8, wherein;
the first radar signal data corresponding to the first angular range of visibility comprises a plurality of first azimuth values corresponding to the first angular range of visibility, each of the plurality of first azimuth values having an associated plurality of first range values;
the second radar signal data corresponding to the second angular range of visibility comprises a plurality of second azimuth values corresponding to the second angular range of visibility, each of the plurality of second azimuth values having an associated plurality of second range values; and
the modified second radar signal data comprises a plurality of modified second azimuth values corresponding to the second angular range of visibility, each of the plurality of modified second azimuth values having an associated plurality of modified second range values.

11. The system of claim 7, herein the one or more processing units are operable to combine at least a portion the first radar signal data with at least a portion of the modified second radar signal data to form a combined radar signal data by:
storing one or more of a plurality of first azimuth values of the first radar signal data in corresponding columns of a first portion of a buffer table, the buffer table comprising:
  a plurality of columns corresponding to a plurality of azimuth values representing a three-hundred sixty degree angular range of visibility; and
  a plurality of rows corresponding to a plurality of range values; and storing one or more of a plurality of modified second azimuth values of the modified second radar signal in corresponding columns of a second portion of the buffer table.

12. The system of claim 7, wherein the one or more processing units are operable to combine at least a portion the first radar signal data with at least a portion of the modified second radar signal data to form a combined radar signal data by:
storing one or more of a plurality of first range values for each of a plurality of first azimuth values of the first radar signal data in corresponding rows of a first portion of a buffer table, the buffer table comprising:
  a plurality of columns corresponding to a plurality of azimuth values representing a three-hundred sixty degree angular range of visibility; and
  a plurality of rows corresponding to a plurality of range values; and
storing one or more of a plurality of modified second range values for each of a plurality modified second azimuth values in corresponding rows of a second portion of the buffer table.

13. A computer readable storage medium including code for combining data from multiple radar signals on a single PPI display, the code when executed operable to perform operations comprising:
receiving, from a first radar device having a first angular range of visibility, first radar signal data corresponding to the first angular range of visibility;
receiving, from a second radar device having a second angular range of visibility, second radar signal data corresponding to the second angular range of visibility;
performing compensation processing on at least a portion of the second radar signal data to form modified second radar signal data that is correlated to the first radar signal data by:
  applying motion compensation to the second radar signal data, wherein the motion compensation modifies the azimuth angles and ranges of the second radar signal data such that the azimuth angles and ranges of the modified second radar signal are those that would have been measured if the second radar signal device had been transmitting electromagnetic wave pulses synchronously with the first radar device, and
  applying parallax compensation to the second radar signal data such that the azimuth angle of the modified second radar signal data are the azimuth angles that would have been measured if the second radar device were located at the same location as the first radar device;
combining at least a portion the first radar signal data with at least a portion of the modified second radar signal data to form combined radar signal data; and
generating, based on the combined radar signal data, a display on a radar PPI display.

14. The computer readable storage medium of claim 13, wherein the combined radar signal data corresponds to a combined angular range of visibility, the combined angular range of visibility being greater than the first angular range of visibility of the first radar device.

15. The computer readable storage medium of claim 14, wherein the combined angular range of visibility is three-hundred sixty degrees.

16. The computer readable storage medium of claim 13, wherein:
the first radar signal data corresponding to the first angular range of visibility comprises a plurality of first azimuth values corresponding to the first angular range of visibility, each of the plurality of first azimuth values having an associated plurality of first range values;
the second radar signal data corresponding to the second angular range of visibility comprises a plurality of second azimuth values corresponding to the second angular range of visibility, each of the plurality of second azimuth values having an associated plurality of second range values; and the modified second radar signal data comprises a plurality of modified second azimuth values corresponding to the second angular range of visibility, each of the plurality of modified second azimuth values having an associated plurality of modified second range values.

17. The computer readable storage medium of claim 13, wherein combining at least a portion the first radar signal data with at least a portion of the modified second radar signal data to form a combined radar signal data comprises:

storing one or more of a plurality of first azimuth values of the first radar signal data in corresponding columns of a first portion of a buffer table, the buffer table comprising:
a plurality of columns corresponding to a plurality of azimuth values representing a three-hundred sixty degree angular range of visibility; and
a plurality of rows corresponding to a plurality of range values; and storing one or more of a plurality of modified second azimuth values of the modified second radar signal in corresponding columns of a second portion of the buffer table.

18. The computer readable storage medium of claim 13, wherein combining at least a portion the first radar signal data with at least a portion of the modified second radar signal data to form a combined radar signal data comprises:

storing one or more of a plurality of first range values for each of a plurality of first azimuth values of the first radar signal data in corresponding rows of a first portion of a buffer table, the buffer table comprising:
a plurality of columns corresponding to a plurality of azimuth values representing a three-hundred sixty angular degree range of visibility; and a plurality of rows corresponding to a plurality of range values; and
storing one or more of a plurality of modified second range values for each of a plurality modified second azimuth values in corresponding rows of a second portion of the buffer table.

\* \* \* \* \*

UNITED STATES PATENT AND TRADEMARK OFFICE
CERTIFICATE OF CORRECTION

| | | |
|---|---|---|
| PATENT NO. | : 9,075,145 B2 | Page 1 of 1 |
| APPLICATION NO. | : 13/320017 | |
| DATED | : July 7, 2015 | |
| INVENTOR(S) | : Reiter | |

It is certified that error appears in the above-identified patent and that said Letters Patent is hereby corrected as shown below:

In the claims

Column 21, Line 56 claim 1 delete "angle" and replace with --angles--.

Column 23, Line 16 claim 7 delete "angle" and replace with --angles--.

Column 23, Line 33 claim 10 delete ";" and replace with --:--.

Column 23, Line 50 claim 11 delete "herein" and replace with --wherein--.

Column 24, Line 40 claim 13 delete "angle" and replace with --angles--.

Signed and Sealed this
Twenty-second Day of December, 2015

Michelle K. Lee
*Director of the United States Patent and Trademark Office*